United States Patent [19]
Takeo

[11] Patent Number: 6,075,877
[45] Date of Patent: Jun. 13, 2000

[54] METHOD AND APPARATUS OF IMAGE PROCESSING USING ENERGY SUBSTRACTION PARAMETERS ACCORDING TO THICKNESS OF AN OBJECT

[75] Inventor: Hideya Takeo, Kanagawa-ken, Japan

[73] Assignee: Fuji Photo Film Co., Ltd., Kanagawa-Ken, Japan

[21] Appl. No.: 08/955,179

[22] Filed: Oct. 21, 1997

[30] Foreign Application Priority Data

Oct. 21, 1996 [JP] Japan ................................. 8-278236

[51] Int. Cl.⁷ .................................................. G06K 9/00
[52] U.S. Cl. ...................................... 382/130; 378/98.12
[58] Field of Search ................................. 382/130, 132, 382/274, 275; 378/54, 62, 89, 98.9, 98.11, 98.12

[56] References Cited

U.S. PATENT DOCUMENTS

| | | | |
|---|---|---|---|
| 3,854,049 | 12/1974 | Mistretta et al. | 250/402 |
| 4,284,889 | 8/1981 | Kato et al. | 250/355 |
| 4,346,406 | 8/1982 | Kato et al. | 358/110 |
| 4,710,875 | 12/1987 | Nakajima et al. | 364/414 |
| 4,855,598 | 8/1989 | Ohgoda et al. | 250/327.2 |
| 4,896,037 | 1/1990 | Shimura et al. | 250/327.2 |
| 5,049,748 | 9/1991 | Ito et al. | 250/327.2 |
| 5,210,415 | 5/1993 | Ito | 250/327.2 |
| 5,272,339 | 12/1993 | Shimura et al. | 250/584 |

*Primary Examiner*—Andrew W. Johns
*Attorney, Agent, or Firm*—Sughrue, Mion, Zinn, Macpeak & Seas, PLLC

[57] ABSTRACT

A plurality of radiation image signals, each of which represents one of a plurality of radiation images of a single object and is made up of a series of image signal components, are obtained. The plurality of the radiation images of the single object have been formed respectively with a plurality of kinds of radiation having different energy distributions. A subtraction process is carried out in accordance with predetermined parameters and on image signal components of the radiation image signals, which image signal components represent corresponding picture elements in the radiation images, and a desired tissue pattern embedded in the radiation images is thereby extracted or emphasized. The values of the parameters are altered in accordance with a thickness of the object, and adverse effects of a beam hardening phenomenon and scattering of radiation are thereby reduced.

10 Claims, 7 Drawing Sheets

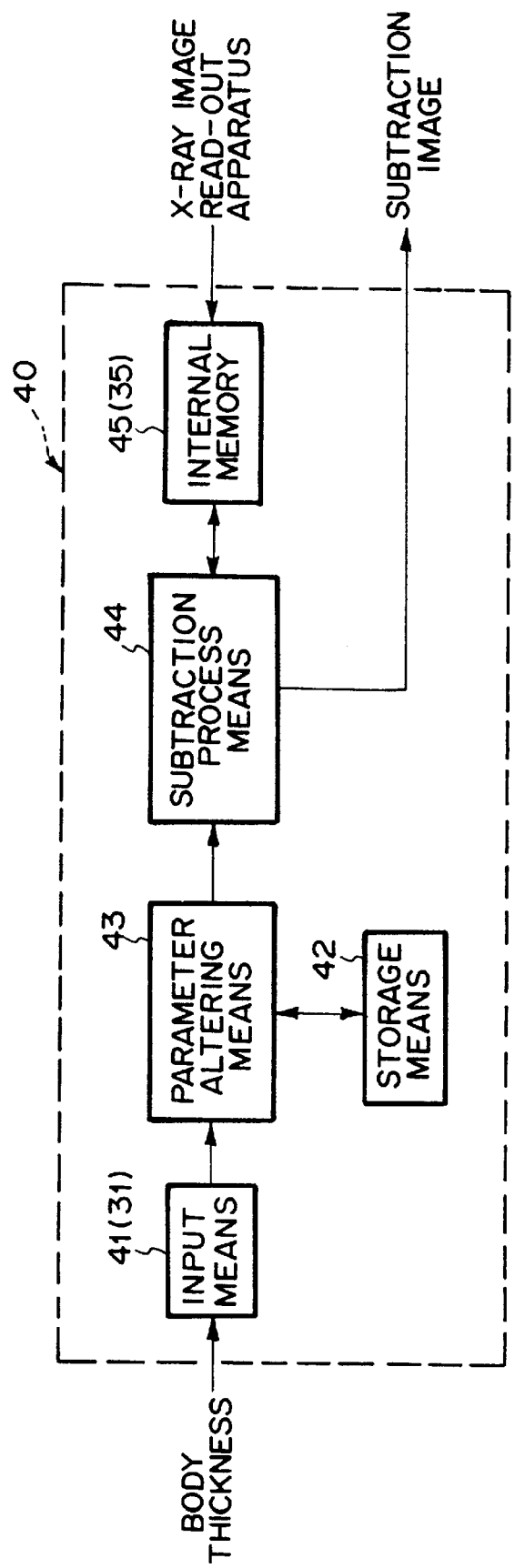

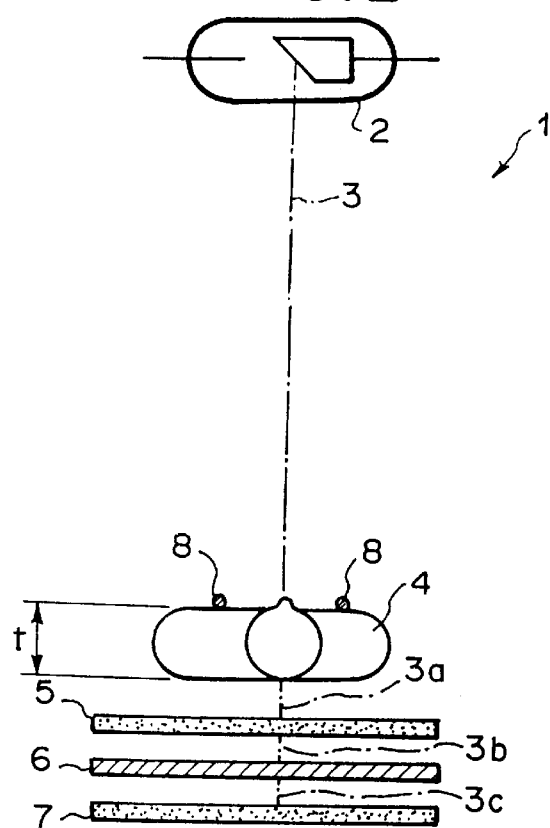
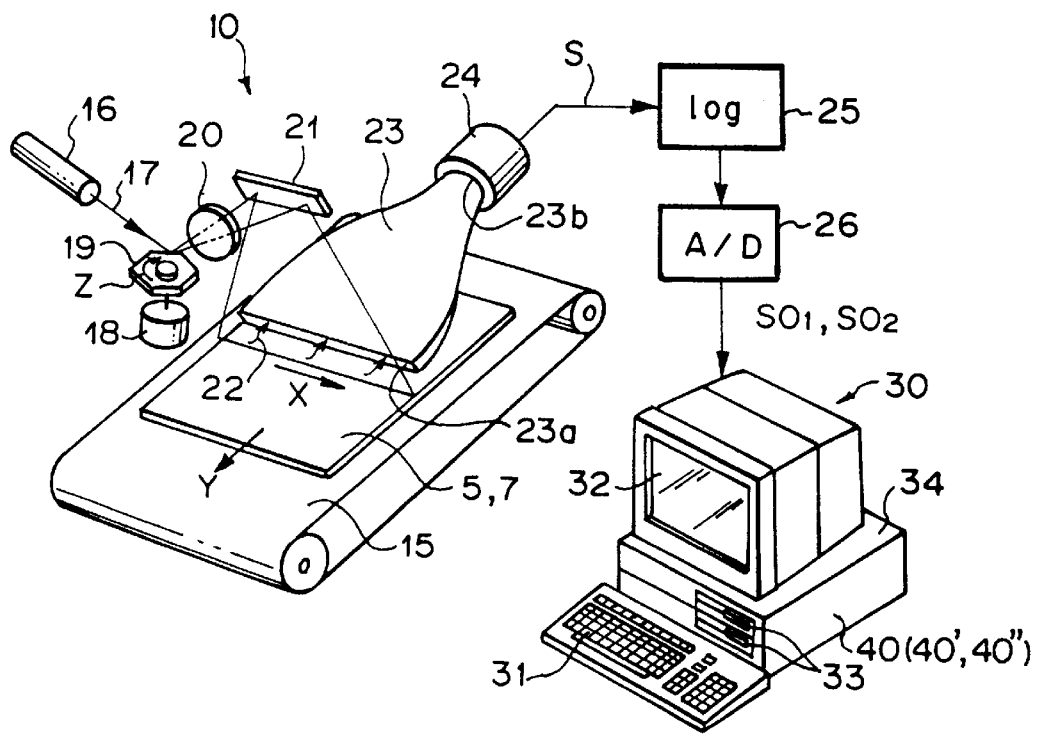

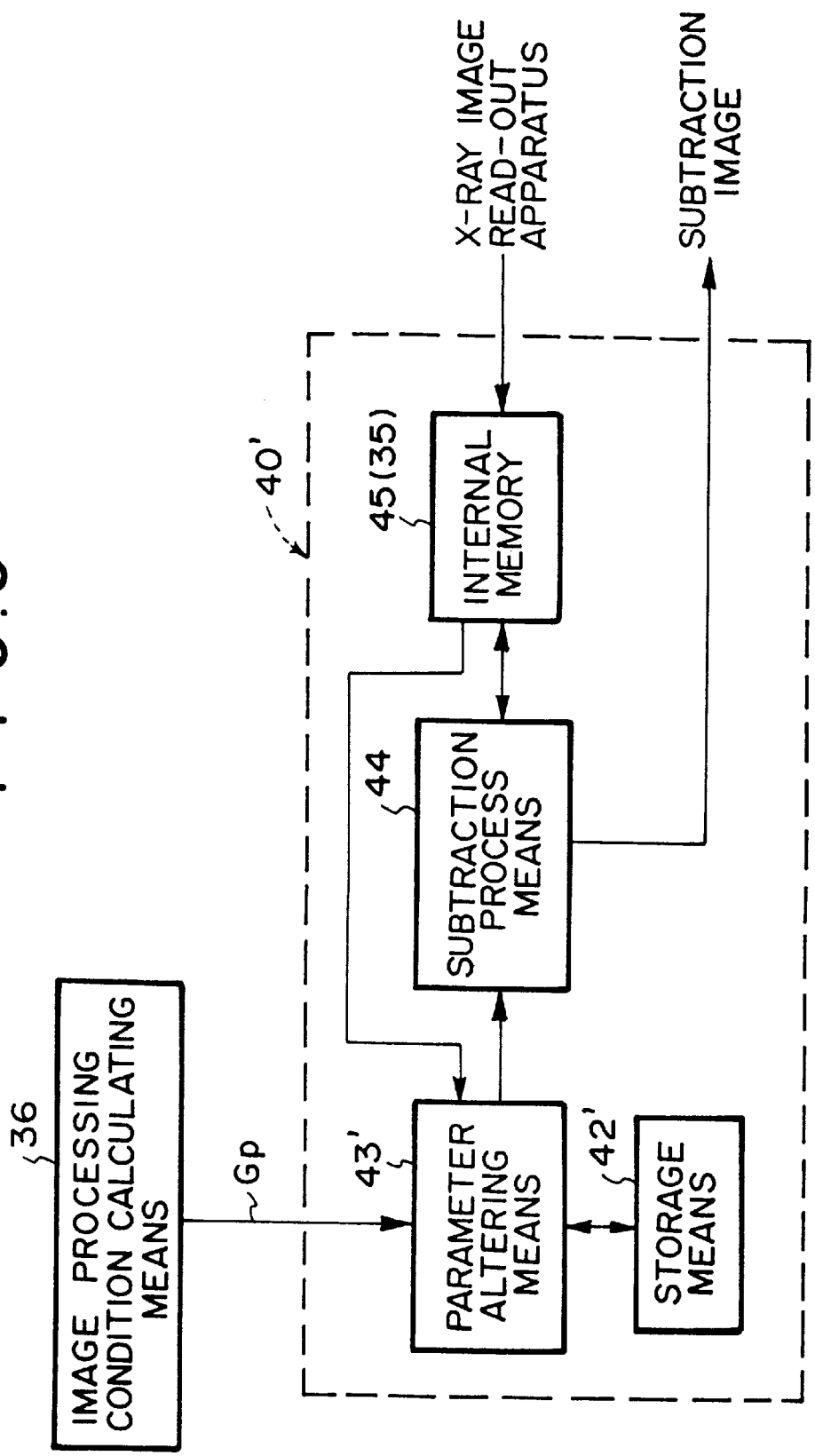

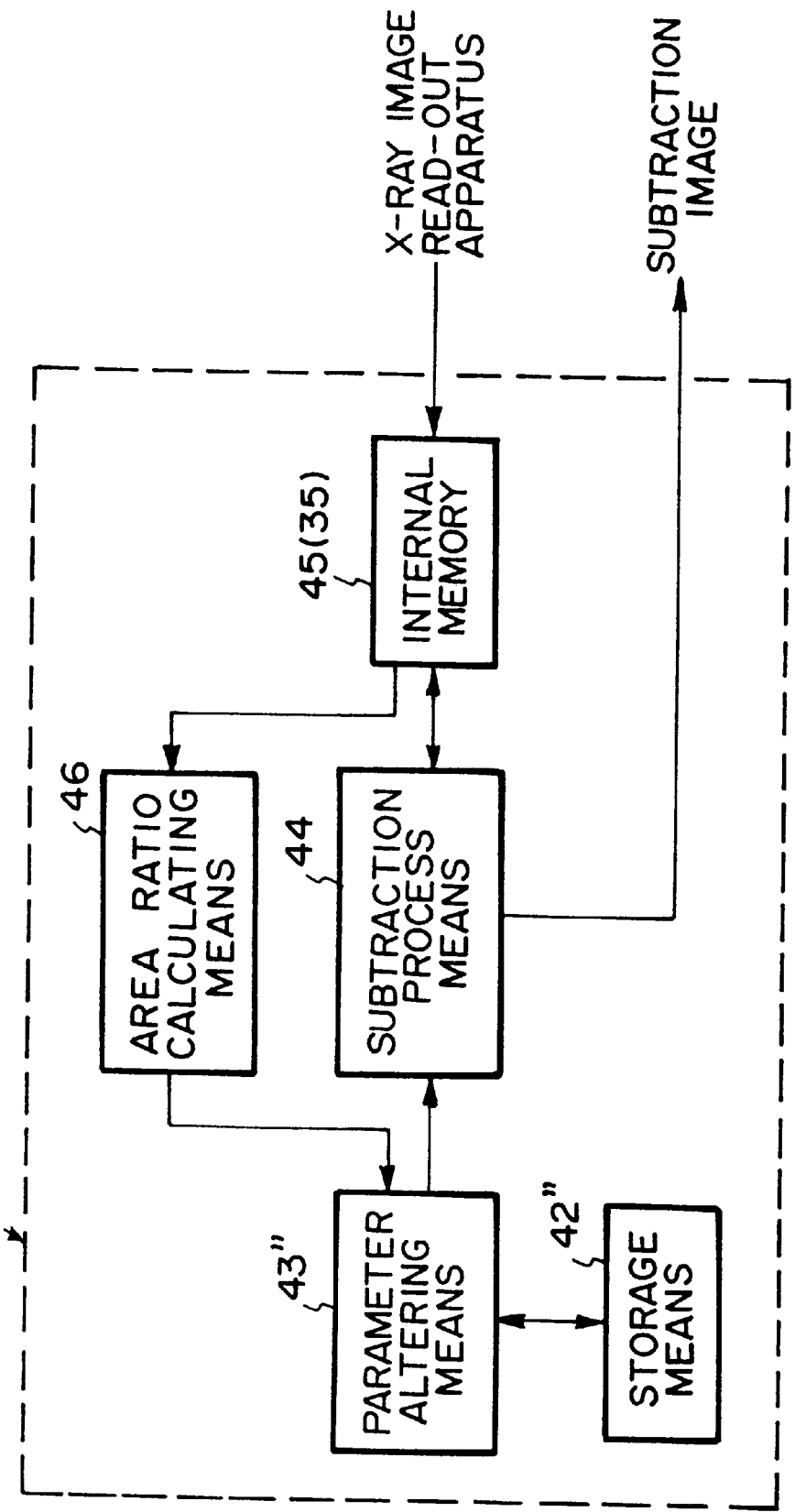

the stimulable phosphor sheet during image readout and
METHOD AND APPARATUS OF IMAGE PROCESSING USING ENERGY SUBSTRACTION PARAMETERS ACCORDING TO THICKNESS OF AN OBJECT

BACKGROUND OF THE INVENTION

1. Field of the Invention

This invention relates to an energy subtraction processing method and apparatus. This invention particularly relates to an improvement in alteration of parameters for energy subtraction processing.

2. Description of the Prior Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, and the X-ray image is photoelectrically read out from the X-ray film, an electric signal (i.e., an image signal) being thereby obtained. The image signal is converted into a digital image signal. The digital image signal is the processed and used for reproducing the X-ray image as a visible image on a photocopy, or the like. In this manner, a visible image having good image quality with high contrast, high sharpness, high graininess, or the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In order for an image signal to be detected accurately, certain factors which affect the image signal must be set in accordance with the dose of radiation delivered to the stimulable phosphor sheet, and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal, which have been adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The applicant proposed various methods for setting the read-out conditions without the preliminary readout being carried out. The methods are described in, for example, U.S. Pat. Nos. 4,284,889 and 4,346,406. With the proposed methods for setting the read-out conditions, a stimulable phosphor sheet, on which a radiation image has been stored, is exposed to radiation, and light, which is emitted instantaneously from the stimulable phosphor sheet, is detected with a photodetector. Information, which represents the characteristics of the radiation image, the amount of energy stored on the stimulable phosphor sheet during its exposure to the radiation, or the like, is obtained from the instantaneously emitted light. The read-out conditions are then adjusted in accordance with the obtained information.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing that affects the gradation, sensitivity, or the like, of a visible image reproduced from the image signal. In the systems wherein the preliminary readout is not carried out, the image processing conditions also include the read-out gain and the scale factor, which serve as the aforesaid read-out conditions. The proposed method is applicable to cases where an image signal is obtained from a radiation image recorded on a recording medium such as conventional X-ray film, as well as to systems using stimulable phosphor sheets. (In this specification, the system for adjusting the read-out conditions and/or the image processing conditions will often be referred to as the EDR processing system or the EDR processing means. EDR is an acronym for an exposure data recognizer.)

In the radiation image recording and reproducing systems wherein recording media, such as X-ray film or stimulable phosphor sheets, are used, subtraction processing techniques for radiation images are often carried out on image signals detected from a plurality of radiation images of an object, which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals, which components represent the image information recorded at corresponding sampling points (i.e., picture elements) in the radiation images, are then subtracted from each other. A difference signal is thereby obtained which represents the image of a specific structure or part of the object (hereinbelow also referred to as the pattern of a tissue, a structure, or the like) represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy distributions. Specifically, an object is exposed to several kinds of radiation with different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images are obtained in which different images of a specific structure are embedded. Thereafter, the image signals representing the plurality of the radiation images are weighted appropriately and subjected to a subtraction process in order to extract the image of the specific structure. The subtraction process is carried out with Formula (1) shown below. The applicant proposed novel energy subtraction processing methods using stimulable phosphor sheets in, for example, U.S. Pat. Nos. 4,855, 598 and 4,896,037.

$$Sproc = Ka \cdot H - Kb \cdot L + Kc \qquad (1)$$

wherein Sproc represents the subtraction image signal obtained from the subtraction process, Ka and Kb represent the weight factors, Kc represents the bias component, H represents the image signal representing the radiation image recorded with the radiation having a high energy level, and L represents the image signal representing the radiation image recorded with the radiation having a low energy level. (The group of Ka, Kb, and Kc will hereinbelow be referred to as the parameters for the subtraction process.)

In the aforesaid energy subtraction processing, when an object is exposed to radiation having a predetermined energy distribution in the course of recording radiation images of the object, the levels of radiation transmittance vary for different thicknesses of the object. Also, the object exhibits a lower level of radiation transmittance with respect to the low energy components of the radiation than the high energy components thereof. Therefore, as the radiation passes through the object, the energy distribution of the radiation shifts to the high energy side as a whole. Such a phenomenon is referred to as the "beam hardening."

For example, in cases where quantitative determination of a bone mineral in a bone is carried out with the energy subtraction processing, even if the thickness of the bone in the object is the same, the problems described below will occur. Specifically, if the thickness of the soft tissue surrounding the bone is large, the effects of the beam hardening phenomenon will be large, and therefore the image density of the bone pattern in the object image will become low. If the thickness of the soft tissue surrounding the bone is small, the effects of the beam hardening phenomenon will be small, and therefore the image density of the bone pattern in the object image will become high.

If the image density of the extracted tissue pattern fluctuates due to a difference in level of effects of the beam hardening phenomenon, adverse effects will occur on the accuracy of the diagnosis, or the like. Particularly, in cases where an energy subtraction image, which was obtained from energy subtraction processing in the past, and an energy subtraction image, which has currently been obtained from energy subtraction processing, are compared with each other, if there is a difference in level of effects of the beam hardening phenomenon between the two images, there will be the risk that a diseased part is judged by mistake as having been cured.

Further, an energy subtraction image is liable to be affected by scattering of the radiation in the object, and the image quality of the energy subtraction image changes in accordance with the degree of the radiation scattering. Therefore, in order for the image quality of the energy subtraction image to be kept good, it is necessary for the effects of the radiation scattering in the object to be considered.

SUMMARY OF THE INVENTION

The primary object of the present invention is to provide an energy subtraction processing method, wherein adverse effects of a beam hardening phenomenon and scattering of radiation are reduced.

Another object of the present invention is to provide an apparatus for carrying out the energy subtraction processing method.

An energy subtraction processing method and apparatus in accordance with the present invention are characterized by altering parameters for a subtraction process in accordance with the thickness of an object and thereby reducing adverse effects of a beam hardening phenomenon and scattering of radiation.

Specifically, the present invention provides a first energy subtraction processing method, comprising the steps of:

i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises altering the values of the parameters in accordance with a thickness of the object.

The term "parameters" as used herein means the parameters Ka, Kb, and Kc for the subtraction process in Formula (1) shown above. How the parameters are to be altered in accordance with the thickness of the object can ordinarily be determined experimentally and based upon experience.

In the above-described first energy subtraction processing method and also in the below-described various other methods and apparatuses according to the present invention, including those defined in claims, the expression of "with a plurality of kinds of radiation having different energy distributions" does not necessarily mean a plurality of separate radiations but includes a plurality of kinds of radiations originated from a single radiation wherein, for example, one is a direct radiation from a radiation source, and the other is a radiation from the same radiation source, which has passed through a recording medium (e.g., a stimulable phosphor sheet) and/or a filter, or the like, and the low energy components of which have been filtered out. Therefore, the plurality of the radiation images can be formed one after another by using different radiations having different energy distributions. Alternatively, the plurality of the radiation images can be formed simultaneously by using a single radiation and placing a plurality of recording media (e.g., stimulable phosphor sheets) one upon another with or without a filter interposed therebetween. When the filter is not used, the stimulable phosphor sheet located closer to the radiation source serves as a filter for filtering out the low energy components of the radiation.

The present invention also provides a second energy subtraction processing method, comprising the steps of:

i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises altering the values of the parameters in accordance with image processing conditions, which have been calculated from a single image signal among the plurality of the radiation image signals or from a mean value of image signal values of at least two image signals among the plurality of the radiation image signals, such that the desired tissue pattern embedded in the radiation images may be reproduced with an appropriate level of gradation.

The term "image processing conditions" as used herein means the image processing conditions in the aforesaid system for adjusting image processing conditions. Specifically, the term "image processing conditions" means the scale factor (Gp) value, or the like. In lieu of the scale factor (Gp) value, the latitude (L=4/Gp) value may be employed.

It has been found experimentally by the applicant that the scale factor (Gp) value becomes small as the thickness of the object becomes large. The second energy subtraction processing method in accordance with the present invention is based upon such findings.

The present invention further provides a third energy subtraction processing method, comprising the steps of:

i) obtaining a plurality of chest radiation image signals, each of which represents one of a plurality of radiation images of the chest of a single object and is made up of a series of image signal components, the plurality of the radiation images of the chest of the single object having been formed respectively with a plurality of kinds of radiation having different energy distributions, and ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises calculating an area ratio of a pattern of a region under the diaphragm to a lung field pattern in accordance with at least one radiation image among the plurality of the chest radiation images, and altering the values of the parameters in accordance with the area ratio.

It has been found by the applicant that the ratio ($S_B/S_A$) of the area $S_B$ of the pattern of the region under the diaphragm to the area $S_A$ of the lung field pattern becomes large as the thickness of the object becomes large. The third energy subtraction processing method in accordance with the present invention is based upon such findings.

The term "region under the diaphragm" as used herein means the abdominal cavity.

The present invention still further provides a first energy subtraction processing apparatus, comprising:

i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises the provision of:
an input means for inputting information representing a thickness of the object, and
a parameter altering means for altering the values of the parameters in accordance with the inputted thickness of the object.

The present invention also provides a second energy subtraction processing apparatus, comprising:

i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises the provision of a parameter altering means for altering the values of the parameters in accordance with image processing conditions, which have been calculated by a predetermined image processing condition calculating means and from a single image signal among the plurality of the radiation image signals or from a mean value of image signal values of at least two image signals among the plurality of the radiation image signals, such that the desired tissue pattern embedded in the radiation images may be reproduced with an appropriate level of gradation.

The term "image processing conditions calculated by an image processing condition calculating means" as used herein means the image processing conditions in the aforesaid system for adjusting image processing conditions. Specifically, the term "image processing conditions" means the scale factor (Gp) value, or the like. In lieu of the scale factor (Gp) value, the latitude (L=4/Gp) value may be employed.

The present invention further provides a third energy subtraction processing apparatus, comprising:

i) means for obtaining a plurality of chest radiation image signals, each of which represents one of a plurality of radiation images of the chest of a single object and is made up of a series of image signal components, the plurality of the radiation images of the chest of the single object having been formed respectively with a plurality of kinds of radiation having different energy distributions, and ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises the provision of:

an area ratio calculating means for calculating an area ratio of a pattern of a region under the diaphragm to a lung field pattern in accordance with at least one radiation image among the plurality of the chest radiation images, and a parameter altering means for altering the values of the parameters in accordance with the area ratio.

With the energy subtraction processing methods and apparatuses in accordance with the present invention, the values of the parameters for the subtraction process are altered in accordance with the thickness of the object, the image processing conditions, such as the scale factor value or the latitude value, which have a correlation with the thickness of the object, or the area ratio of the pattern of the region under the diaphragm to the lung field pattern, which area ratio has a correlation with the thickness of the object. In this manner, the desired tissue pattern can be obtained such that it may be free from adverse effects of the beam hardening phenomenon and the scattered radiation. With the energy subtraction processing methods and apparatuses in accordance with the present invention, particularly, markedly large effects can be obtained in cases where an energy subtraction image, which has been obtained with respect to a single object having a certain thickness, and an energy subtraction image, which has been obtained with respect to the same object after its thickness has changed with the passage of time, are compared with each other. Therefore, the energy subtraction processing methods and apparatuses in accordance with the present invention are efficient for obtaining appropriate diagnostic information.

BRIEF DESCRIPTION OF THE DRAWINGS

FIG. 1 is a block diagram showing an embodiment of the first energy subtraction processing apparatus in accordance with the present invention, FIG. 2 is a schematic view showing an example of an X-ray image recording apparatus, FIG. 3 is a perspective view showing an example of an X-ray image read-out apparatus and an image processing and displaying apparatus, in which the energy subtraction processing apparatus shown in FIG. 1 is employed, FIG. 5 is a block diagram showing an embodiment of the second energy subtraction processing apparatus in accordance with the present invention, FIG. 7 is a block diagram showing an embodiment of the third energy subtraction processing apparatus in accordance with the present invention, FIG. 8B-1 is an explanatory view showing an X-ray image of the chest of an object having a small thickness, FIG. 8B-2 is a graph showing a histogram of an image signal representing the X-ray image shown in FIG. 8B-1, FIG. 8C-1 is an explanatory view showing an X-ray image of the chest of an object having a large thickness, and FIG. 8C-2 is a graph showing a histogram of an image signal representing the X-ray image shown in FIG. 8C-1.

DESCRIPTION OF THE PREFERRED EMBODIMENTS

The present invention will hereinbelow be described in further detail with reference to the accompanying drawings.

Figure 8A:
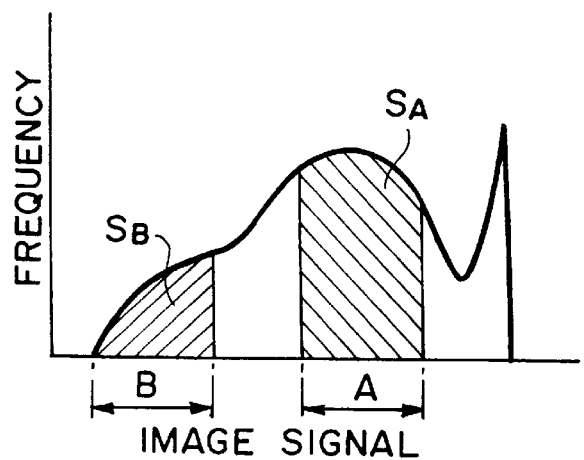
FIG. 8A is a graph showing a histogram of an image signal, the graph serving as an aid in explaining an area of a lung field pattern and an area of a pattern of a region under the diaphragm in accordance with a thickness of an object.
Figures 1, 8B:
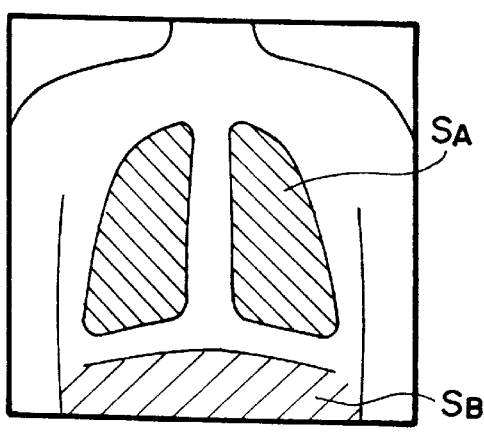
Figures 2, 8B:
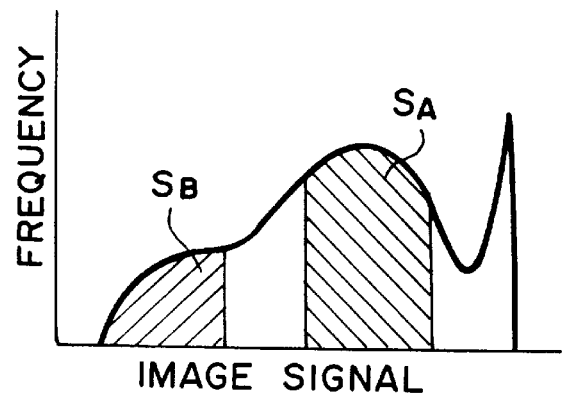

FIG. 1 is a block diagram showing an embodiment of the first energy subtraction processing apparatus in accordance with the present invention. FIG. 2 is a schematic view showing an example of an X-ray image recording apparatus. FIG. 3 is a perspective view showing an example of an X-ray image read-out apparatus and an image processing and displaying apparatus, in which the energy subtraction processing apparatus shown in FIG. 1 is employed.

As illustrated in FIG. 1, an energy subtraction processing apparatus 40 comprises an input means 41 for inputting information representing a body thickness t of an object, and a storage means 42 for storing information representing predetermined parameters Ka, Kb, and Kc for a subtraction process. The energy subtraction processing apparatus 40 also comprises a parameter altering means 43 for altering the values of the parameters Ka, Kb, and Kc in accordance with the body thickness t of the object, which has been inputted from the input means 41. The energy subtraction processing apparatus 40 further comprises an internal memory 45 for storing two X-ray image signals, each of which has been obtained by reading out one of two X-ray images of the object for energy subtraction processing. The two X-ray images of the object have been formed respectively with two kinds of X-rays having different energy distributions. The energy subtraction processing apparatus 40 still further comprises a subtraction process means 44 for carrying out a subtraction process on the two X-ray image signals, which are received from the internal memory 45, and in accordance with altered parameters Ka', Kb', and Kc'. The subtraction process is carried out with Formula (1') shown below.

$$S1 = Ka' \cdot SO_2 - Kb' \cdot SO_1 + Kc' \quad (1')$$

wherein S1 represents the subtraction image signal obtained from the subtraction process, Ka' and Kb' represent the altered weight factors, Kc' represents the altered bias component, $SO_2$ represents the image signal representing the X-ray image recorded with the X-rays having a high energy level, and $SO_1$ represents the image signal representing the X-ray image recorded with the X-rays having a low energy level. (The group of Ka', Kb', and Kc' will hereinbelow be referred to as the altered parameters for the subtraction process.)

The functions of the input means 41 are achieved by a keyboard 31 of an image processing and displaying apparatus 30 shown in FIG. 3, which will be described later. Also, the functions of the internal memory 45 are achieved by an internal memory 35 (not shown in FIG. 3) of the image processing and displaying apparatus 30.

How the X-ray images are recorded will be described hereinbelow. As illustrated in FIG. 2, X-rays 3 are produced by an X-ray tube 2 of an X-ray image recording apparatus 1 and irradiated to an object 4 (in this example, the chest of a human body). X-rays 3a, which have passed through the object 4, impinge upon a first stimulable phosphor sheet 5, and the comparatively low energy components of the X-rays 3a are stored on the first stimulable phosphor sheet 5. In this manner, an X-ray image of the object 4 is stored on the first stimulable phosphor sheet 5.

X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7.

During the image recording operation, marks 8, 8 are placed on the object 4. The images of the marks 8, 8 are utilized in the course of adjusting the positions of the two X-ray images so that the two X-ray images may coincide with each other. In the X-ray image recording apparatus 1, the X-ray images are stored on the first stimulable phosphor sheet 5 and the second stimulable phosphor sheet 7 with a single simultaneous recording operation. Alternatively, the two X-ray images may be recorded on a single stimulable phosphor sheet, which comprises two stimulable phosphor layers formed on opposite surfaces and an energy separation filter interleaved as an intermediate layer between the two stimulable phosphor layers. As another alternative, the two X-ray images may be recorded one after the other on the two stimulable phosphor sheets and with two independent recording operations.

After the first X-ray image and the second X-ray image have been stored respectively on the first stimulable phosphor sheet 5 and the second stimulable phosphor sheet 7 in the X-ray image recording apparatus 1 shown in FIG. 2, the first stimulable phosphor sheet 5 and the second stimulable phosphor sheet 7 are placed one after the other at a predetermined position in an X-ray image read-out apparatus 10 shown in FIG. 3. How the first X-ray image is read out from the first stimulable phosphor sheet 5 will be described hereinbelow.

With reference to FIG. 3, the first stimulable phosphor sheet 5 is conveyed in a sub-scanning direction indicated by the arrow Y by a sheet conveyance means 15, which may be constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which may be constituted of an fO lens, or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. In this manner, an analog signal S is obtained from the photomultiplier 24.

The analog signal S, which has been generated by the photomultiplier 24, is logarithmically amplified by a logarithmic amplifier 25, and fed into an analog-to-digital converter 26. The analog-to-digital converter 26 samples the analog signal S, and the sampled signal is converted into a digital image signal SO. The image signal SO thus obtained represents the first X-ray image, which was stored on the first stimulable phosphor sheet 5, and will hereinafter be referred to as the first X-ray image signal $SO_1$. The first X-ray image signal $SO_1$ is stored in the internal memory 45 (or 35) of the image processing and displaying apparatus 30.

The image processing and displaying apparatus 30 is provided with an embodiment of the energy subtraction processing apparatus in accordance with the present invention and carries out various kinds of image processing on an image signal. The image processing and displaying apparatus 30 is provided with a keyboard 31, from which various instructions and information representing the body thickness t of the object are entered, and a CRT display device 32, which displays auxiliary information for instructions and a visible image represented by an image signal. The image processing and displaying apparatus 30 is also provided with a floppy disk drive unit 33, which receives and operates a floppy disk serving as a storage medium, and a main body 34 which incorporates a CPU and the internal memory 35.

Thereafter, in the same manner as that described above, a second X-ray image signal $SO_2$ is obtained which represents the second X-ray image having been stored on the second stimulable phosphor sheet 7. The second X-ray image signal $SO_2$ is stored in the internal memory 45 of the image processing and displaying apparatus 30.

Figure 4:
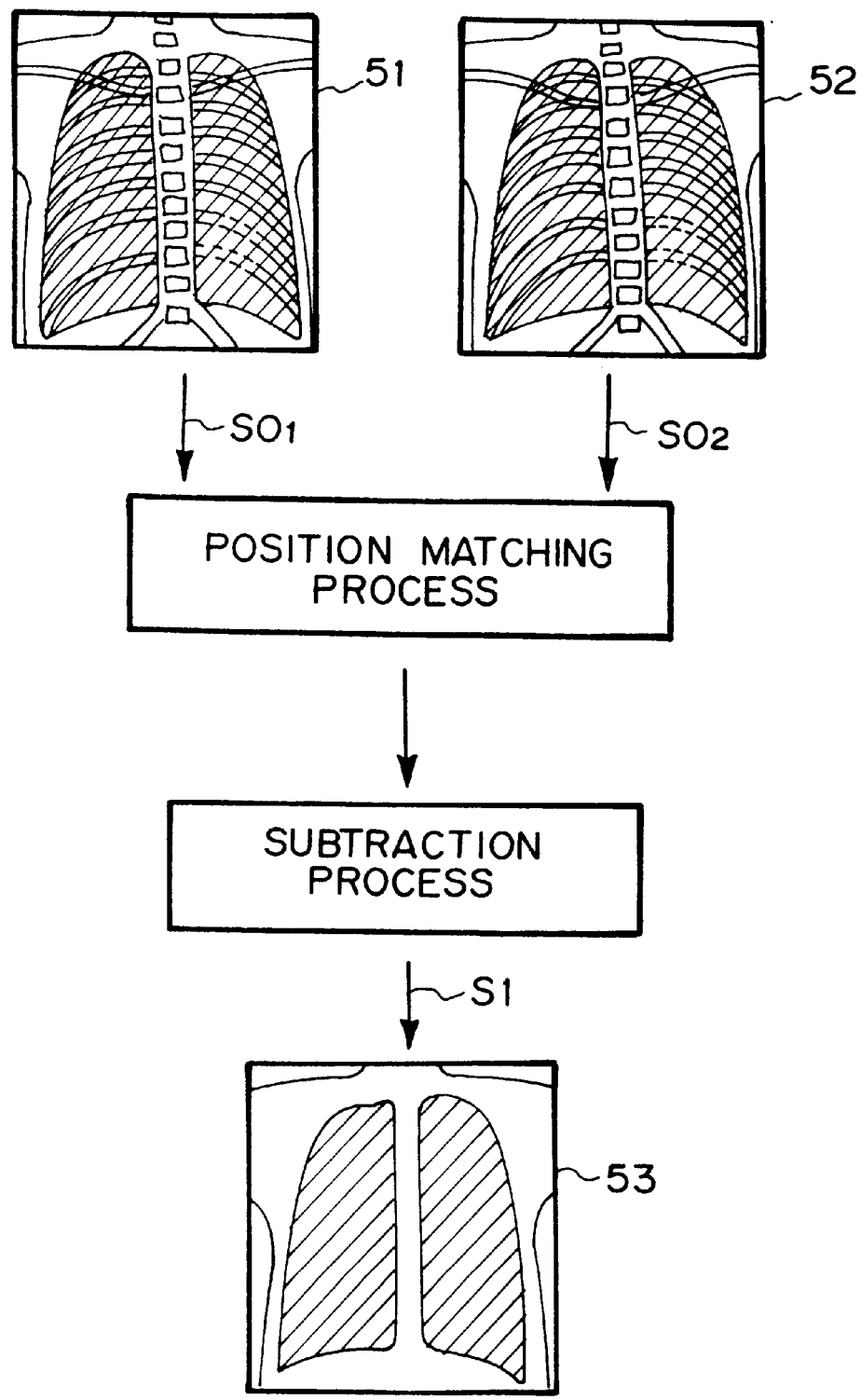
FIG. 4 is a flow chart showing how processing is carried out in an energy subtraction processing apparatus 40 and on a first X-ray image signal $SO_1$ and a second X-ray image signal $SO_2$, which respectively represent a first X-ray image and a second X-ray image and are stored in an internal memory 45 of the image processing and displaying apparatus.

FIG. 4 is a flow chart showing how the processing is carried out in the energy subtraction processing apparatus 40 and on the first X-ray image signal $SO_1$ and the second X-ray image signal $SO_2$, which respectively represent the first X-ray image and the second X-ray image and are stored in the internal memory 45 of the image processing and displaying apparatus 30.

The first X-ray image signal $SO_1$ and the second X-ray image signal $SO_2$, which are stored in the internal memory 45, respectively represent a first X-ray image 51 and a second X-ray image 52 shown in FIG. 4. The first X-ray image 51 has been recorded with the X-rays having a comparatively low energy level. The second X-ray image 52 has been recorded with the X-rays having a comparatively high energy level. Both of the first X-ray image 51 and the second X-ray image 52 are the original images composed of patterns of soft tissues and bones. The levels of image density of the soft tissue patterns and the bone patterns are different between the first X-ray image 51 and the second X-ray image 52.

Firstly, the information representing the body thickness t of the object illustrated in FIG. 2 is inputted by the operator from the keyboard (input means) 41. The information representing the body thickness t of the object is then fed into the parameter altering means 43. The parameter altering means 43 reads information, which represents the parameters Ka, Kb, and Kc for the subtraction process with respect to an object having a standard body thickness to, from the storage means 42 and alters the parameters Ka, Kb, and Kc into parameters Ka', Kb', and Kc', such that the adverse effects of the beam hardening phenomenon upon the energy subtraction image with respect to the object having the inputted body thickness t may be reduced. The information representing the altered parameters Ka', Kb', and Kc' is fed into the subtraction process means 44.

The subtraction process means 44 reads the first X-ray image signal $SO_1$ and the second X-ray image signal $SO_2$ from the internal memory 45 and carries out a position matching process on the first X-ray image signal $SO_1$ and the second X-ray image signal $SO_2$ such that the positions of the first X-ray image 51 represented by the first X-ray image signal $SO_1$ and the second X-ray image 52 represented by the second X-ray image signal $SO_2$ may coincide with each other. For this purpose, a technique disclosed in, for example, U.S. Pat. No. 4,710,875 may be employed. With the position matching process, one of the two X-ray images is linearly moved or rotated with respect to the other X-ray image until the images of the marks 8, 8 in one X-ray image, which marks are shown in FIG. 2, overlap the images of the marks 8, 8 in the other X-ray image. Thereafter, the subtraction process is carried on the first X-ray image signal $SO_1$ and the second X-ray image signal $SO_2$. With the subtraction process, the image signal components of the first X-ray image signal $SO_1$ and the second X-ray image signal $SO_2$, which image signal components represent corresponding picture elements in the first X-ray image 51 and second X-ray image 52, are subtracted from each other. The subtraction process is carried out with Formula (1') shown below.

$$S1 = Ka' \cdot SO_2 - Kb' \cdot SO_1 + Kc' \quad (1')$$

From the subtraction process, a soft tissue image signal (a subtraction image signal) S1 is obtained. The soft tissue image signal S1 represents a soft tissue image 53 shown in FIG. 4, in which the pattern of the bone of the object 4 has been erased and only the pattern of the soft tissue has been extracted.

The thus calculated soft tissue image signal S1 is fed into the CRT display device 32 of the image processing and displaying apparatus 30. A visible image (the soft tissue image 53) is reproduced from the soft tissue image signal S1 and displayed on the CRT display device 32.

As described above, the parameters for the subtraction process are altered in accordance with the body thickness t of the object. Therefore, in the soft tissue image 53 reproduced and displayed on the CRT display device 32, the adverse effects of the beam hardening phenomenon fluctuating in accordance with the body thickness t of the object have been reduced.

In this manner, with the energy subtraction processing apparatus 40 in accordance with the present invention, an image can be obtained, in which the adverse effects of the beam hardening phenomenon have been reduced and which has good image quality and can serve as an effective tool in, particularly, the efficient and accurate diagnosis of an illness.

FIG. 5 is a block diagram showing an energy subtraction processing apparatus 40', which serves as an embodiment of the second energy subtraction processing apparatus in accordance with the present invention. As illustrated in FIG. 5, in the energy subtraction processing apparatus 40', the values of the parameters for the subtraction process are altered in accordance with the scale factor (Gp) value, which is calculated by an image processing condition calculating means (an EDR processing means) 36 provided in the image processing and displaying apparatus 30.

The image processing condition calculating means 36 forms a histogram, which represents the distribution of the frequency of occurrence of image signal levels of the received image signal. Also, the image processing condition calculating means 36 detects the image signal, which corresponds to a desired image portion, in accordance with the pattern of the histogram and calculates the scale factor (Gp) value and the gain (Sk) value, such that the desired image portion may be reproduced with an appropriate level of gradation in the visible image. Such a process is described in, for example, U.S. Pat. No. 5,272,339.

Figure 6A:
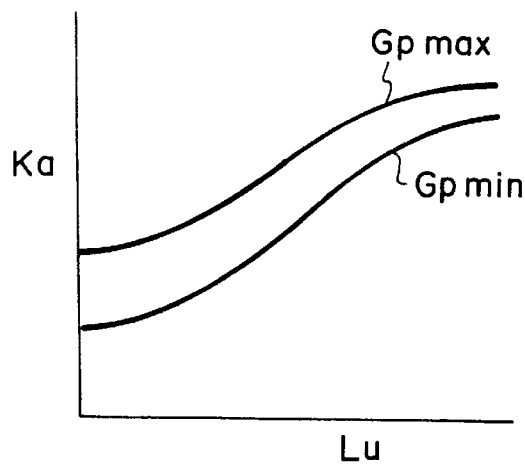
FIG. 6A is a graph showing a conversion table prepared for a parameter Ka.
Figure 6B:
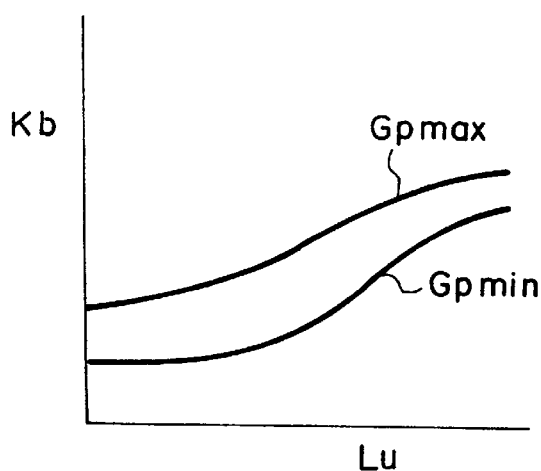
FIG. 6B is a graph showing a conversion table prepared for a parameter Kb.
Figure 6C:
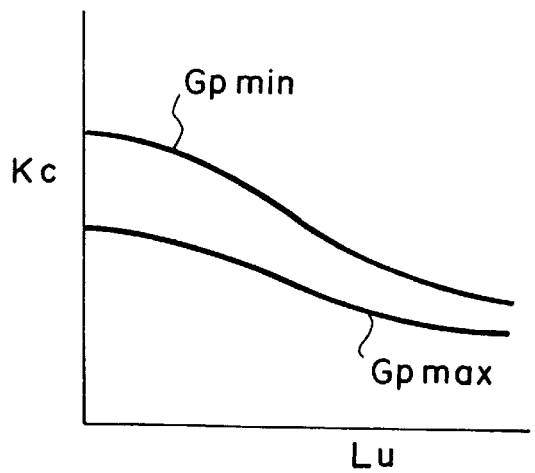
FIG. 6C is a graph showing a conversion table prepared for a parameter Kc.

The energy subtraction processing apparatus 40' comprises a storage means 42' for storing information representing a conversion table, which specifies a predetermined image signal with respect to each scale factor (Gp) value and the corresponding value of the parameter Ka, a conversion table, which specifies the predetermined image signal with respect to each scale factor (Gp) value and the corresponding value of the parameter Kb, and a conversion table, which specifies the predetermined image signal with respect to each scale factor (Gp) value and the corresponding value of the parameter Kc. The conversion tables are illustrated in FIGS. 6A, 6B, and 6C. The energy subtraction processing apparatus 40' also comprises the internal memory 45 for storing two X-ray image signals, each of which has been obtained by reading out one of two X-ray images of the object for energy subtraction processing. The two X-ray images of the object have been formed respectively with two kinds of X-rays having different energy distributions. The energy subtraction processing apparatus 40' further comprises a parameter altering means 43'. The parameter altering means 43' reads the first X-ray image signal $SO_1$, which represents the first X-ray image 51 having been recorded with the X-rays having a comparatively low energy level and is among the two X-ray image signals stored in the internal memory 45, from the internal memory 45. The parameter altering means 43' then calculates an unsharp mask signal Lu composed of a simple mean value of the image signal values of the first X-ray image signal $SO_1$, which represent all picture elements falling within a picture element matrix having a size of 127 columns×127 rows. Thereafter, the parameter altering means 43' alters the values of the parameters Ka, Kb, and Kc such that they may correspond to the scale factor (Gp) value, which is received from the image processing condition calculating means 36, and the calculated unsharp mask signal Lu. The energy subtraction processing apparatus 40' still further comprises the subtraction process means 44 for carrying out the subtraction process on the two X-ray image signals, which are received from the internal memory 45. The subtraction process is carried out with Formula (1') shown above.

As described above, the storage means 42' stores the information representing the conversion tables. As illustrated in FIGS. 6A, 6B, and 6C, each of the conversion tables is prepared for one of the parameters Ka, Kb, and Kc. The conversion table for the parameter Ka comprises a curve, which specifies the relationship between a predetermined Gpmax (=3.0) value and the value of the parameter Ka, and a curve, which specifies the relationship between a predetermined Gpmin (=1.0) value and the value of the parameter Ka. The conversion table for the parameter Kb comprises a curve, which specifies the relationship between the predetermined Gpmax (=3.0) value and the value of the parameter Kb, and a curve, which specifies the relationship between the predetermined Gpmin (=1.0) value and the value of the parameter Kb. Also, the conversion table for the parameter Kc comprises a curve, which specifies the relationship between the predetermined Gpmax (=3.0) value and the value of the parameter Kc, and a curve, which specifies the relationship between the predetermined Gpmin (=1.0) value and the value of the parameter Kc. The Gpmax value is the scale factor (Gp) value, which is set when the thickness of the object is assumed to be smallest. The Gpmin value is the scale factor (Gp) value, which is set when the thickness of the object is assumed to be largest.

The parameter altering means 43' calculates the values of the parameters Ka', Kb', and Kc', which correspond to the scale factor (Gp) value received from the image processing condition calculating means 36. The values of the parameters Ka', Kb', and Kc' are calculated with interpolating operations (linear interpolating operations) in accordance with the Gpmax value and the Gpmin value in the conversion tables, which values correspond to the unsharp mask signal Lu, and the scale factor (Gp) value received from the image processing condition calculating means 36.

How the energy subtraction processing apparatus 40' of FIG. 5 operates will be described hereinbelow.

As in the energy subtraction processing apparatus 40 illustrated in FIG. 1, the first X-ray image signal $SO_1$ representing the first X-ray image 51 and the second X-ray image signal $SO_2$ representing the second X-ray image 52 are stored in the internal memory 45.

The information representing the scale factor (Gp) value is fed from the image processing condition calculating means 36 into the parameter altering means 43'.

The parameter altering means 43' reads the first X-ray image signal $SO_1$, which represents the first X-ray image 51 having been recorded with the X-rays having a comparatively low energy level and is among the two X-ray image signals stored in the internal memory 45, from the internal memory 45. The parameter altering means 43' then calculates the unsharp mask signal Lu composed of the simple mean value of the image signal values of the first X-ray image signal $SO_1$, which represent all picture elements falling within the picture element matrix having a size of 127 columns×127 rows.

Thereafter, the parameter altering means 43' reads the information representing the conversion tables for the respective parameters, which are shown in FIGS. 6A, 6B, and 6C, from the storage means 42'. The parameter altering means 43' calculates the parameter values Kamax, Kbmax, and Kcmax on the Gpmax curves corresponding to the unsharp mask signal Lu. Also, the parameter altering means 43' calculates the parameter values Kamin, Kbmin, and Kcmin on the Gpmin curves corresponding to the unsharp mask signal Lu.

The parameter altering means 43' sets the scale factor (Gp) value, which has been received from the image processing condition calculating means 36, between the Gpmax value and the Gpmin value, which correspond to the calculated unsharp mask signal Lu, in the conversion table for each parameter. The parameter altering means 43' thereby calculates an interpolation coefficient of the scale factor (Gp) value. Specifically, an interpolation coefficient s, which is represented by the formula of Gp=s·Gpmax+(1−s)·Gpmin, is calculated.

Thereafter, the values of the parameters Ka', Kb', and Kc' are calculated by using the interpolation coefficient s. The calculations are made with the formulas shown below.

$$Ka'=s \cdot Kamax+(1-s) \cdot Kamin$$
$$Kb'=s \cdot Kbmax+(1-s) \cdot Kbmin$$
$$Kc'=s \cdot Kcmax+(1-s) \cdot Kcmin$$

The thus calculated parameters Ka', Kb', and Kc' are the parameters depending upon the scale factor (Gp) value, i.e. depending upon the body thickness t. The information representing the values of the parameters Ka', Kb', and Kc' is fed into the subtraction process means 44.

The subtraction process means 44 reads the first X-ray image signal $SO_1$ and the second X-ray image signal $SO_2$ from the internal memory 45 and carries out a position matching process on the first X-ray image signal $SO_1$ and the second X-ray image signal $SO_2$ such that the positions of the first X-ray image 51 represented by the first X-ray image signal $SO_1$ and the second X-ray image 52 represented by the second X-ray image signal $SO_2$ may coincide with each other. Thereafter, the subtraction process is carried on the first X-ray image signal $SO_1$ and the second X-ray image signal $SO_2$. With the subtraction process, the image signal components of the first X-ray image signal $SO_1$ and the second X-ray image signal $SO_2$, which image signal components represent corresponding picture elements in the first X-ray image 51 and second X-ray image 52, are subtracted from each other. The subtraction process is carried out with Formula (1') shown above. From the subtraction process, the soft tissue image signal (the subtraction image signal) S1 is obtained. The soft tissue image signal S1 represents the soft tissue image 53 shown in FIG. 4, in which the pattern of the bone of the object 4 has been erased and only the pattern of the soft tissue has been extracted.

The thus calculated soft tissue image signal S1 is fed into the CRT display device 32 of the image processing and displaying apparatus 30. A visible image (the soft tissue image 53) is reproduced from the soft tissue image signal S1 and displayed on the CRT display device 32.

As described above, the parameters for the subtraction process are altered in accordance with the scale factor (Gp) value, i.e. in accordance with the body thickness t of the object. Therefore, in the soft tissue image 53 reproduced and displayed on the CRT display device 32, the adverse effects of the beam hardening phenomenon fluctuating in accordance with the body thickness t of the object have been reduced.

In this manner, with the energy subtraction processing apparatus 40' in accordance with the present invention, the information representing the body thickness of the object need not be entered from the exterior, and the body thickness can be quantitatively rated from the scale factor (Gp) value. As a result, an image can be obtained, in which the adverse effects of the beam hardening phenomenon have been reduced and which has good image quality and can serve as an effective tool in, particularly, the efficient and accurate diagnosis of an illness.

In the image processing condition calculating means 36, the calculation of the scale factor (Gp) value may be made from the first X-ray image signal $SO_1$. Alternatively, the calculation of the scale factor (Gp) value may be made from the second X-ray image signal $SO_2$. As another alternative, the calculation of the scale factor (Gp) value maybe made from the mean value of the image signal values of the first X-ray image signal $SO_1$ and the second X-ray image signal $SO_2$.

Also, in lieu of the scale factor (Gp) value, the latitude (L=4/Gp) value may be employed.

Further, in this embodiment of the second energy subtraction processing apparatus in accordance with the present invention, the scale factor (Gp) takes values in accordance with the level of the unsharp mask signal Lu, and the values of the parameters are changed with respect to each picture element in the subtraction process. However, the second energy subtraction processing method and apparatus in accordance with the present invention are not limited to the aforesaid embodiment. For example, the subtraction process may be carried out by using the predetermined parameter values regardless of the level of the unsharp mask signal Lu. In such cases, the conversion table for each parameter may be composed of a Gpmax straight line and a Gpmin straight line, which take predetermined parameter values regardless of the level of the unsharp mask signal Lu.

FIG. 7 is a block diagram showing an energy subtraction processing apparatus 40", which serves as an embodiment of the third energy subtraction processing apparatus in accordance with the present invention.

The energy subtraction processing apparatus 40" comprises the internal memory 45 for storing two chest X-ray image signals, each of which has been obtained by reading out one of two X-ray images of the chest of the object for energy subtraction processing. The two X-ray images of the chest of the object have been formed respectively with two kinds of X-rays having different energy distributions. The energy subtraction processing apparatus 40" also comprises an area ratio calculating means 46 for calculating an area ratio of a pattern of a region under the diaphragm (i.e., the abdominal cavity) to a lung field pattern in accordance with at least one X-ray image among the two the chest X-ray images. The area ratio is calculated from the histogram of the chest X-ray image signal. The energy subtraction processing apparatus 40" further comprises a storage means 42" for storing the information representing the predetermined parameters Ka, Kb, and Kc for the subtraction process, and a parameter altering means 43" for altering the values of the parameters Ka, Kb, and Kc in accordance with the area ratio having been calculated by the area ratio calculating means 46. The energy subtraction processing apparatus 40" still further comprises the subtraction process means 44 for carrying out 31 the subtraction process on the two X-ray image signals, which are received from the internal memory 45. The subtraction process is carried out with Formula (1') shown above.

How the energy subtraction processing apparatus 40" of FIG. 7 operates will be described hereinbelow.

As in the energy subtraction processing apparatus 40 illustrated in FIG. 1, the first X-ray image signal $SO_1$ representing the first X-ray image 51 and the second X-ray image signal $SO_2$ representing the second X-ray image 52 are stored in the internal memory 45. Thereafter, the area ratio calculating means 46 forms the histogram of either one of the two image signals stored in the internal memory 45 or the histogram of a signal, which is obtained by calculating the arithmetic mean value of the image signal values of the two image signals stored in the internal memory 45. The area ratio calculating means 46 then specifies the abdominal cavity pattern and the lung field pattern from the condition of the signal distribution in the histogram of the image signal and calculates the area ratio h of the specified abdominal cavity pattern to the specified lung field pattern from the histogram.

Specifically, in the histogram shown in, for example, FIG. 8A, the range of the image signal corresponding to the lung field pattern is indicated by a range A. Also, the range of the image signal corresponding to the abdominal cavity pattern is indicated by a range B. An area $S_A$ of the lung field pattern and an area $S_B$ of the abdominal cavity pattern are calculated with, for example, integration of the range A of the histogram curve and integration of the range B of the histogram curve. The area ratio h ($=S_B/S_A$) is then calculated.

It has been found experimentally that, as the body thickness t becomes large, the area of the abdominal cavity pattern becomes large and the area of the lung field pattern becomes comparatively small with respect to the area of the abdominal cavity pattern. As a result, as the body thickness t becomes large, the area ratio h becomes large.

Figures 1, 8C:
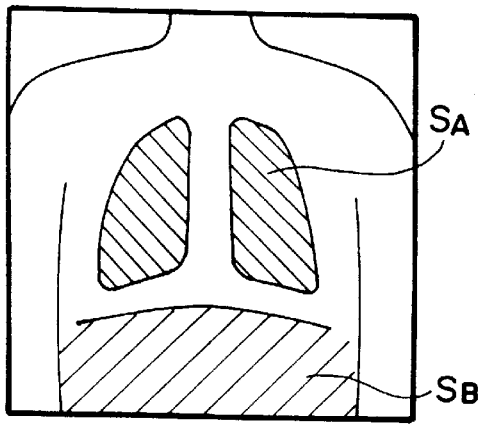
Figures 2, 8C:
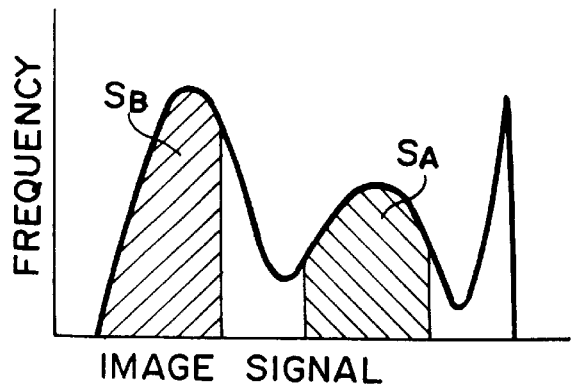

FIG. 8B-1 is an explanatory view showing the X-ray image of the chest of the object having a small body thickness t, and FIG. 8B-2 is a graph showing the histogram of the image signal representing the X-ray image shown in FIG. 8B-1. FIG. 8C-1 is an explanatory view showing the X-ray image of the chest of the same object having a large body thickness t, and FIG. 8C-2 is a graph showing the histogram of the image signal representing the X-ray image shown in FIG. 8C-1. As illustrated in FIGS. 8B-2 and 8C-2, the level of the body thickness t can be rated quantitatively from the area ratio h. In such cases, the information representing the value of the body thickness need not be entered from the exterior.

The information representing the calculated area ratio h is fed into the parameter altering means 43". The parameter altering means 43" reads the information, which represents the parameters Ka, Kb, and Kc for the subtraction process with respect to an object having an area ratio hO corresponding to a standard body thickness tO, from the storage means 42" and alters the parameters Ka, Kb, and Kc into parameters Ka', Kb', and Kc', such that the adverse effects of the X-ray scattering upon the energy subtraction image with respect to the object having the inputted area ratio h may be reduced. The information representing the altered parameters Ka', Kb', and Kc' is fed into the subtraction process means 44.

The subtraction process means 44 reads the first X-ray image signal $SO_1$ and the second X-ray image signal $SO_2$ from the internal memory 45 and carries out a position matching process on the first X-ray image signal $SO_1$ and the second X-ray image signal $SO_2$ such that the positions of the first X-ray image 51 represented by the first X-ray image signal $SO_1$ and the second X-ray image 52 represented by the second X-ray image signal $SO_2$ may coincide with each other. Thereafter, the subtraction process is carried on the first X-ray image signal $SO_1$ and the second X-ray image signal $SO_2$. With the subtraction process, the image signal components of the first X-ray image signal $SO_1$ and the second X-ray image signal $SO_2$, which image signal components represent corresponding picture elements in the first X-ray image 51 and second X-ray image 52, are subtracted from each other. The subtraction process is carried out with Formula (1') shown above. From the subtraction process, for example, the soft tissue image signal (the subtraction image signal) S1 is obtained. The soft tissue image signal S1 represents the soft tissue image 53 shown in FIG. 4, in which the pattern of the bone of the object 4 has been erased and only the pattern of the soft tissue has been extracted.

The thus calculated soft tissue image signal S1 is fed into the CRT display device 32 of the image processing and displaying apparatus 30. A visible image (the soft tissue image 53) is reproduced from the soft tissue image signal S1 and displayed on the CRT display device 32.

As described above, the parameters for the subtraction process are altered in accordance with the area ratio of the abdominal cavity pattern to the lung field pattern, i.e. in accordance with the body thickness t of the object. Therefore, in the soft tissue image 53 reproduced and displayed on the CRT display device 32, the adverse effects of the X-ray scattering, which fluctuates in accordance with the body thickness t of the object, have been reduced.

In this manner, with the energy subtraction processing apparatus 40" in accordance with the present invention, an image can be obtained, in which the adverse effects of the X-ray scattering have been reduced and which has good image quality and can serve as an effective tool in, particularly, the efficient and accurate diagnosis of an illness.

What is claimed is:

1. An energy subtraction processing method, comprising the steps of:
    i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
    ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized,
    wherein the improvement comprises altering the values of the parameters in accordance with a thickness of the object.

2. An energy subtraction processing method, comprising:
    i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
    ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized,
    wherein the improvement comprises altering the values of the parameters in accordance with image processing conditions, which have been calculated from a single image signal among the plurality of the radiation image signals or from a mean value of image signal values of at least two image signals among the plurality of the radiation image signals, such that the desired tissue pattern embedded in the radiation images may be reproduced with an appropriate level of gradation;
    wherein said image processing conditions are constituted of a scale factor value or a latitude value, which represents an input-output ratio of the radiation image signal.

3. An energy subtraction processing method, comprising the steps of:
    i) obtaining a plurality of chest radiation image signals, each of which represents one of a plurality of radiation images of the chest of a single object and is made up of a series of image signal components, the plurality of the radiation images of the chest of the single object having been formed respectively with a plurality of kinds of radiation having different energy distributions, and
    ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized,
    wherein the improvement comprises calculating an area ratio of a pattern of a region under the diaphragm to a lung field pattern in accordance with at least one radiation image among the plurality of the chest radiation images, and
    altering the values of the parameters in accordance with said area ratio.

4. An energy subtraction processing apparatus, comprising:
    i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
    ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized,
    wherein the improvement comprises the provision of:
        an input means for inputting information representing a thickness of the object, and
        a parameter altering means for altering the values of the parameters in accordance with the inputted thickness of the object.

5. An energy subtraction processing apparatus, comprising:
    i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and
    ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized,
    wherein the improvement comprises the provision of a parameter altering means for altering the values of the parameters in accordance with image processing conditions, which have been calculated by a predetermined image processing condition calculating means and from a single image signal among the plurality of the radiation image signals or from a mean value of image signal values of at least two image signals among the plurality of the radiation image signals, such that the desired tissue pattern embedded in the radiation images may be reproduced with an appropriate level of gradation;

wherein said image processing conditions are constituted of a scale factor value or a latitude value, which represents an input-output ratio of the radiation image signal.

6. An energy subtraction processing apparatus, comprising:

i) means for obtaining a plurality of chest radiation image signals, each of which represents one of a plurality of radiation images of the chest of a single object and is made up of a series of image signal components, the plurality of the radiation images of the chest of the single object having been formed respectively with a plurality of kinds of radiation having different energy distributions, and ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises the provision of:

an area ratio calculating means for calculating an area ratio of a pattern of a region under the diaphragm to a lung field pattern in accordance with at least one radiation image among the plurality of the chest radiation images, and a parameter altering means for altering the values of the parameters in accordance with said area ratio.

7. An energy subtraction processing method, comprising:

i) obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises altering the values of the parameters in accordance with image processing conditions, which have been calculated from a histogram representing a frequency distribution of image signal levels of the series of image signal components from a single image signal among the plurality of the radiation image signals, such that the desired tissue pattern embedded in the radiation images may be reproduced with an appropriate level of gradation.

8. A method as defined in claim 7 wherein said image processing conditions are constituted of a scale factor value or a latitude value, which represents an input-output ratio of the radiation image signal.

9. An energy subtraction processing apparatus, comprising:

i) means for obtaining a plurality of radiation image signals, each of which represents one of a plurality of radiation images of a single object and is made up of a series of image signal components, the plurality of the radiation images of the single object having been formed respectively with a plurality of kinds of radiation having different energy distributions, and ii) means for carrying out a subtraction process in accordance with predetermined parameters and on image signal components of the radiation image signals, which image signal components represent corresponding picture elements in the radiation images, a desired tissue pattern embedded in the radiation images being thereby extracted or emphasized, wherein the improvement comprises the provision of a parameter altering means for altering the values of the parameters in accordance with image processing conditions, which have been calculated from a histogram representing a frequency distribution of image signal levels of the series of image signal components from a single image signal among the plurality of the radiation image signals, such that the desired tissue pattern embedded in the radiation images may be reproduced with an appropriate level of gradation.

10. An apparatus as defined in claim 9 wherein said image processing conditions are constituted of a scale factor value or a latitude value, which represents an input-output ratio of the radiation image signal.

* * * * *